(12) United States Patent
Wipplinger et al.

(10) Patent No.: US 8,645,056 B2
(45) Date of Patent: *Feb. 4, 2014

(54) SYSTEM AND METHOD FOR ELECTRONIC MOVING MAP AND AERONAUTICAL CONTEXT DISPLAY

(75) Inventors: Patrick Ralf Wipplinger, Moerfelden-Walldorf (DE); Jens Schiefele, Hessen (DE); Thorsten Wiesemann, Hessen (DE)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/347,964

(22) Filed: Jan. 11, 2012

(65) Prior Publication Data

US 2012/0123680 A1    May 17, 2012

Related U.S. Application Data

(63) Continuation of application No. 11/564,761, filed on Nov. 29, 2006, now Pat. No. 8,195,383.

(51) Int. Cl.
*G01C 21/00* (2006.01)

(52) U.S. Cl.
USPC .......... 701/408; 701/6; 701/11; 701/14; 701/120; 701/432; 701/508; 345/7; 345/156; 345/184; 345/173; 345/619

(58) Field of Classification Search
USPC .......................................................... 701/408
See application file for complete search history.

(56) References Cited

U.S. PATENT DOCUMENTS

| | | | |
|---|---|---|---|
| 5,519,392 A * | 5/1996 | Oder et al. | 340/995.27 |
| 5,559,707 A | 9/1996 | DeLorme et al. | |
| 5,731,979 A * | 3/1998 | Yano et al. | 701/455 |
| 5,802,492 A | 9/1998 | DeLorme et al. | |
| 6,112,141 A * | 8/2000 | Briffe et al. | 701/14 |
| 6,175,801 B1 * | 1/2001 | Millington | 701/428 |
| 6,202,026 B1 * | 3/2001 | Nimura et al. | 701/455 |
| 6,452,570 B1 * | 9/2002 | Kuenzner | 345/7 |
| 6,507,776 B1 * | 1/2003 | Fox, III | 701/11 |
| 6,516,268 B2 * | 2/2003 | Ruiz et al. | 701/431 |
| 6,732,049 B2 | 5/2004 | Sato et al. | |

(Continued)

FOREIGN PATENT DOCUMENTS

| | | | |
|---|---|---|---|
| JP | 2000348286 A * | 12/2000 | G08G 1/09 |
| JP | 20000348286 | 12/2000 | |

*Primary Examiner* — Redhwan K Mawari

(74) *Attorney, Agent, or Firm* — Harness, Dickey & Pierce, P.L.C.

(57) ABSTRACT

A system and method for controlling a display of geographical data on a primary display device to assist in navigating a mobile platform such as an aircraft, ship, train, land-based motor vehicle, etc. The system includes a graphical user interface module (GUI) for receiving a plurality of user inputs, and an image control module. The GUI generates a primary display of the complete route being traveled on the primary display device. If the entire route does not fit on the display device, then the image control module generates data that the GUI uses to generate a context display on the primary display device. The context display presents the entire route as a smaller image on the primary display device, simultaneously with the primary display. The user inputs for the GUI enable the user to zoom, pan and perform other image control operations on either the primary display or the context display.

20 Claims, 12 Drawing Sheets

(56) References Cited

U.S. PATENT DOCUMENTS

| | | |
|---|---|---|
| 6,895,331 B2 | 5/2005 | Yoshida |
| 6,898,523 B2 * | 5/2005 | Cochlovius et al. .......... 701/455 |
| 6,927,782 B2 | 8/2005 | Coldefy et al. |
| 6,954,696 B2 * | 10/2005 | Ihara et al. .................... 701/455 |
| 6,965,816 B2 * | 11/2005 | Walker ............................ 701/16 |
| 7,007,228 B1 * | 2/2006 | Carro ............................ 715/210 |
| 7,023,456 B2 * | 4/2006 | Huber et al. ................. 345/660 |
| 7,106,218 B2 | 9/2006 | Kimura |
| 7,737,867 B2 | 6/2010 | Arthur et al. |
| 7,844,395 B2 | 11/2010 | Aoyama |
| 7,966,125 B2 | 6/2011 | Wipplinger et al. |
| 2003/0023375 A1 | 1/2003 | Yoshida |
| 2003/0179215 A1 * | 9/2003 | Coldefy et al. ................ 345/619 |
| 2004/0225432 A1 | 11/2004 | Pilley et al. |
| 2004/0257340 A1 | 12/2004 | Jawerth |
| 2005/0021522 A1 * | 1/2005 | Herman et al. ................. 707/10 |
| 2005/0024238 A1 | 2/2005 | Kimura |
| 2005/0177304 A1 | 8/2005 | Tu |
| 2006/0178827 A1 * | 8/2006 | Aoyama ....................... 701/211 |
| 2006/0259238 A1 * | 11/2006 | Jung et al. ..................... 701/209 |
| 2006/0293847 A1 | 12/2006 | Marriott et al. |
| 2007/0097103 A1 * | 5/2007 | Yoshioka et al. .............. 345/204 |
| 2007/0106468 A1 | 5/2007 | Eichenbaum et al. |
| 2008/0125962 A1 * | 5/2008 | Wipplinger et al. .......... 701/201 |

* cited by examiner

SYSTEM AND METHOD FOR ELECTRONIC MOVING MAP AND AERONAUTICAL CONTEXT DISPLAY

CROSS-REFERENCE TO RELATED APPLICATIONS

This application is a continuation of U.S. patent application Ser. No. 11/564,761 filed on Nov. 29, 2006. The present application is related in general subject matter to pending U.S. patent application Ser. No. 13/040,864, filed on Mar. 4, 2011, which is a divisional of U.S. application Ser. No. 11/564,758 filed Nov. 29, 2006 (U.S. Pat. No. 7,966,125). The entire disclosures of each of the above applications are incorporated herein by reference.

FIELD

The present disclosure relates generally to maps for use with mobile platforms, and more particularly to a system and method for an electronic moving map and aeronautical context display.

BACKGROUND

The statements in this section merely provide background information related to the present disclosure and may not constitute prior art.

Many mobile platforms (such as trains, ships, aircraft and automobiles) employ geographical maps to guide the mobile platform from an origination point to a destination. For example, aeronautical maps are employed in the operation and navigation of commercial passenger aircraft. Generally, the aeronautical maps employed to navigate commercial passenger aircraft are printed paper maps in which the world is sectioned into particular regions due to size and detail constraints. Thus, typically, an aeronautical map will contain only a small fraction of a geographic region so that the map contains the detail necessary for the navigation of the aircraft through that region.

When navigating a commercial passenger aircraft on a long flight, multiple aeronautical maps may have to be employed to navigate the aircraft along the desired flight plan. The use of multiple aeronautical maps in the cockpit may be cumbersome, and does not provide the pilot with an overview of the entire flight plan.

Accordingly, it would be desirable to provide a system and method for an electronic moving map and aeronautical context display that would reduce or eliminate the need for a paper-based aeronautical map.

SUMMARY

A system and method for controlling a display of geographical data to assist in the navigation of a mobile platform is provided. The system includes a graphical user interface module that generates at least one of a primary display or a secondary display, and receives at least one user input. The system also includes an image control module that generates primary display data for display on the primary display based on the at least one user input and determines, based on the primary display data, whether the secondary display is displayed. The user input comprises geographic data to assist in the navigation of the mobile platform.

In one implementation, a method of controlling a display of geographical data to assist in the navigation of a mobile platform is provided. The method includes determining a route of the mobile platform, and generating a primary display based on the route. The primary display displays at least a portion of the route to assist in the navigation of the mobile platform. The method also includes generating the context display if the portion of the route displayed does not include all of the route. The context display includes the entire route with an indicator of the portion of the route displayed on the primary display.

The present teachings also provide a method of navigating an aircraft using geographical data. The method includes determining a route for the aircraft, in which the route includes an origin and a destination. The method also includes displaying at least a portion of the route to assist in the navigation of the aircraft to the destination from the origin and generating the context display if the entire route from origin to destination is not displayed. The context display includes the entire route with an indicator of the portion of the route displayed. The method further includes moving the indicator, if displayed, based on at least one of a zoom request or a pan request.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

DETAILED DESCRIPTION

Figure 1:
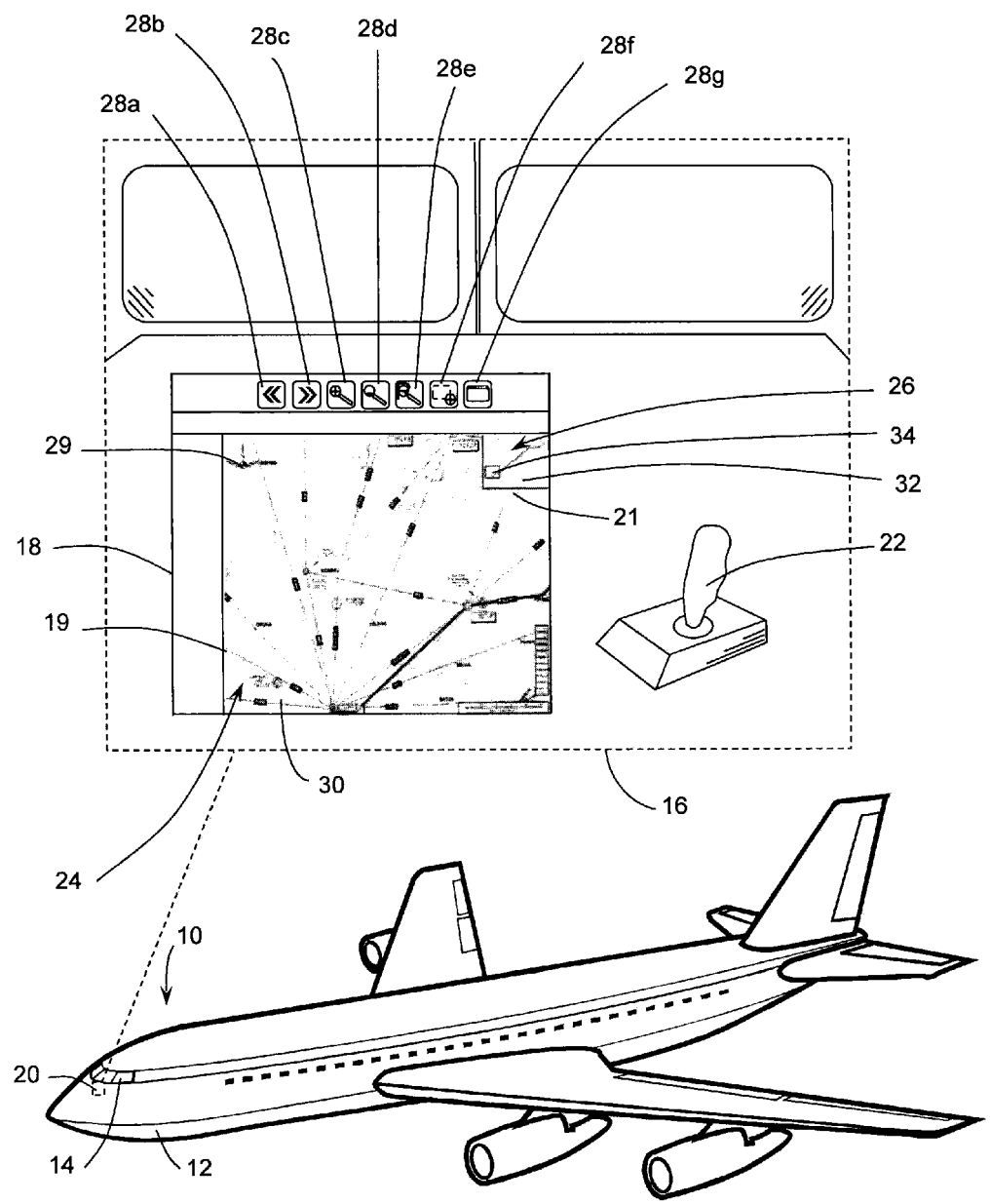
FIG. 1 is a schematic view of a mobile platform incorporating the electronic moving map and aeronautical context display according to the principles of the present disclosure.

With reference to FIG. 1, an aircraft 10 is shown. The aircraft 10 includes a fuselage 12. The fuselage 12 defines a cockpit 14. The cockpit 14 includes a display system 16. The display system 16 includes a graphical user interface (GUI) 18 that is controlled by a display control module 20. It will be understood, that although the display system 16 is shown as being mounted within the cockpit 14, the display system 16 could be a portable system, such as a hand-held display. In addition, it will be understood, that although the display system 16 will be described as having one GUI 18, the display system 16 could have a plurality of GUIs that is associated with the display system 16, or a variety of other control modules associated with the aircraft 10.

The GUI 18 receives a user input through a user input device 22. The user input device 22 may comprise a touch screen, a touch pen, a keyboard, a joystick, a mouse or any other suitable user input device. The GUI 18 includes a primary display 24, a secondary or context display 26, and a plurality of buttons 28. The primary display 24 comprises a majority of the GUI and displays primary display data 30, as will be discussed in greater detail herein. The primary display 24 also includes a compass 29. The compass 29 indicates the orientation of the aircraft 10 with regard to the primary display 24. For example, the compass 29 indicates that the primary display 24 is orientated in the north-up position, with primary display data 30 displayed with north at the top of the primary display 24, or the compass 29 could be orientated in the heading up orientation, such that the direction the aircraft 10 is heading is pointing towards the top of the primary display 24. The context display 26 displays secondary or context display data 32, including an indicator 34, as will be discussed herein. The buttons 28 enable the receipt of the user input. The buttons 28 include a first pan button 28a, a second pan button 28b, a zoom-in button 28c, a zoom-out button 28d, a reset zoom level button 28e, a rectangle zoom button 28f and a full screen button 28g.

The first pan button 28a enables a user to pan the primary display data 30 to the left, and the second pan button 28b enables the user to pan the primary display data 30 to the right. In addition, the user pans the primary display data 30 by moving the indicator 34 within the context display 26 with the user input device 22. The zoom-in button 28c enables the user to increase the magnification of the primary display data 30, while the zoom-out button 28d enables the user to decrease the magnification of the primary display data 30. The reset zoom level button 28e enables the user to reset the magnification of the primary display data 30 to a default setting. The default setting is entered by the user through a GUI for example, but the default setting could also be pre-programmed into the display control module 20.

The rectangle zoom button 28f enables the user, through the user input device 22, to draw a rectangle on the primary display 24 indicative of the area the user would like to increase the magnification of. The full screen button 28g enables the viewing of the primary display data 30 on the entire GUI 18. When selected, the buttons 28 generate a signal associated with the selected action for the display control module 20.

Figure 2:
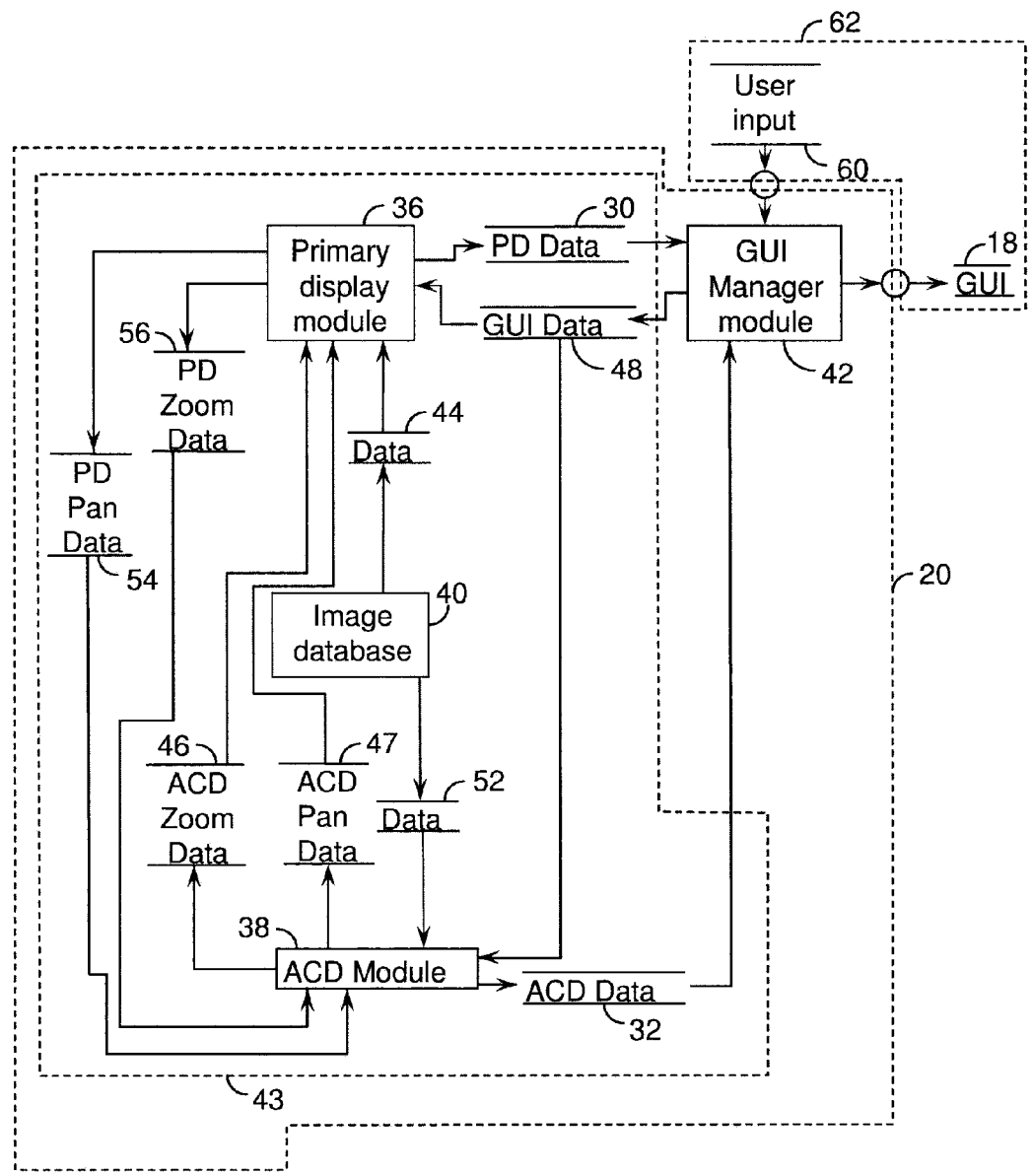
FIG. 2 is a dataflow diagram illustrating an exemplary display control module for the electronic moving map and aeronautical context display of the present disclosure.

With reference to FIG. 2, the display control module 20 for the primary display 24 and context display 26 is shown in accordance with an embodiment of the present disclosure. As used herein, the term "module" refers to an application specific integrated circuit (ASIC), an electronic circuit, a processor (shared, dedicated, or group) and memory that executes one or more software or firmware programs, to a combinational logic circuit, and/or to other suitable components that provide the described functionality. In FIG. 2, a dataflow diagram illustrates various components of a display control system that is embedded within the display control module 20. Various embodiments of the display control module 20 may include any number of sub-modules embedded within the display control module 20. The sub-modules shown in FIG. 2 may be combined and/or further partitioned to similarly control the display of the primary display data 30 and context display data 32. Inputs to the display control module 20 is received from other control modules (not shown) within the aircraft 10, and/or determined by other sub-modules (not shown) within the display control module 20 (not shown). In the embodiment illustrated in FIG. 2, the display control module 20 includes a primary display module 36, the context display module 38, an image database 40 and a GUI manager module 42. The primary display module 36, context display module 38 and the image database 40 forms an image control module 43.

The primary display module 36 receives as input data 44 from the image database 40, context display zoom data 46 and context display pan data 47 from the context display module 38, and GUI data 48 from the GUI manager module 42. The data 44 from the image database 40 comprises an image for display on the primary display 24, based on the context display zoom data 46, the context display pan data 47 and the GUI data 48. The context display zoom data 46 comprises the image displayed on the context display 26, including a location of the indicator 34. The location of the indicator 34 denotes the image to be displayed on the primary display 24. The context display pan data 47 comprises data associated with a revised location of the indicator 34 on the context display 24 upon the receipt of a pan request via the user input device 22. The GUI data 48 comprises the user input from the user input device 22 indicative of a request to zoom, pan or display a full view of the image displayed on the primary display 24, and comprises the selected geographical area for display on the GUI 18. The image for the GUI 18 to display comprises an input from a flight management system associated with the aircraft 10.

Based on the context display zoom data 46, context display pan data 47 and GUI data 48, the primary display module 36 determines the data 44 to be received from the image database 40, with the data 44 comprising the image for display on the primary display 24. The primary display module 36 then sets primary display data 30 for the GUI manager module 42. The primary display data 30 comprises the image for display on the primary display 24 of the GUI 18.

The context display module 38 receives as input data 52 from the image database 40, primary display pan data 54 and primary display zoom data 56 from the primary display module 36, and GUI data 48 from the GUI manager module 42. The data 52 from the image database 40 comprises an image for display on the context display 26, based on the primary display pan data 54, the primary display zoom data 56 and the GUI data 48. The primary display pan data 54 comprises data associated with the image to be displayed on the primary display 24 after a pan request is received by the GUI manager module 42. The primary display zoom data 56 comprises data associated with the image to be displayed on the primary display 24 after a zoom request is received by the GUI manager module 42. The GUI data 48 comprises the user input from the user input device 22 indicative of a request to pan the image displayed on the primary display 24 made through moving the indicator 34 on the context display 26, as will be discussed further herein.

Based on the primary display pan data 54, the primary display zoom data 56 and GUI data 48, the context display module 38 determines the data 52 to be received from the image database 40, with the data 52 comprising the image for display on the context display 26. The context display module 38 then sets context display data 32 for the GUI manager module 42. The context display data 32 comprises the image for display on the context display 26 of the GUI 18.

The GUI manager module 42 outputs the GUI 18 and receives as input user input data 60. The GUI manager module 42 also receives as input the primary display data 30 and the context display data 32. The GUI 18 is any suitable GUI, and comprises any number of GUIs to display the primary display data 30 and context display data 32. Generally, the GUI 18 and user input data 60 comprise a GUI control panel 62 that creates the GUI 18. The GUI manager module 42, upon receipt of the primary display data 30 and the context display data 32 outputs the GUI 18 to display the primary display data 30 on the primary display 24 and the context display data 32 on the context display 26. Further, upon receipt of the user input data 60, provided through the user input device 22, the GUI manager module 42 sets GUI data 48 for the primary display module 36 and the context display module 38. The user input data 60 comprises an origin and/or a destination of a route associated with the navigation of the aircraft 10, the route of the aircraft, a terminal chart associated with a terminal or airport of the origin and/or destination of the aircraft 10 and/or an airport map associated with the terminal or airport of the origin and/or destination of the aircraft 10.

Figure 3:
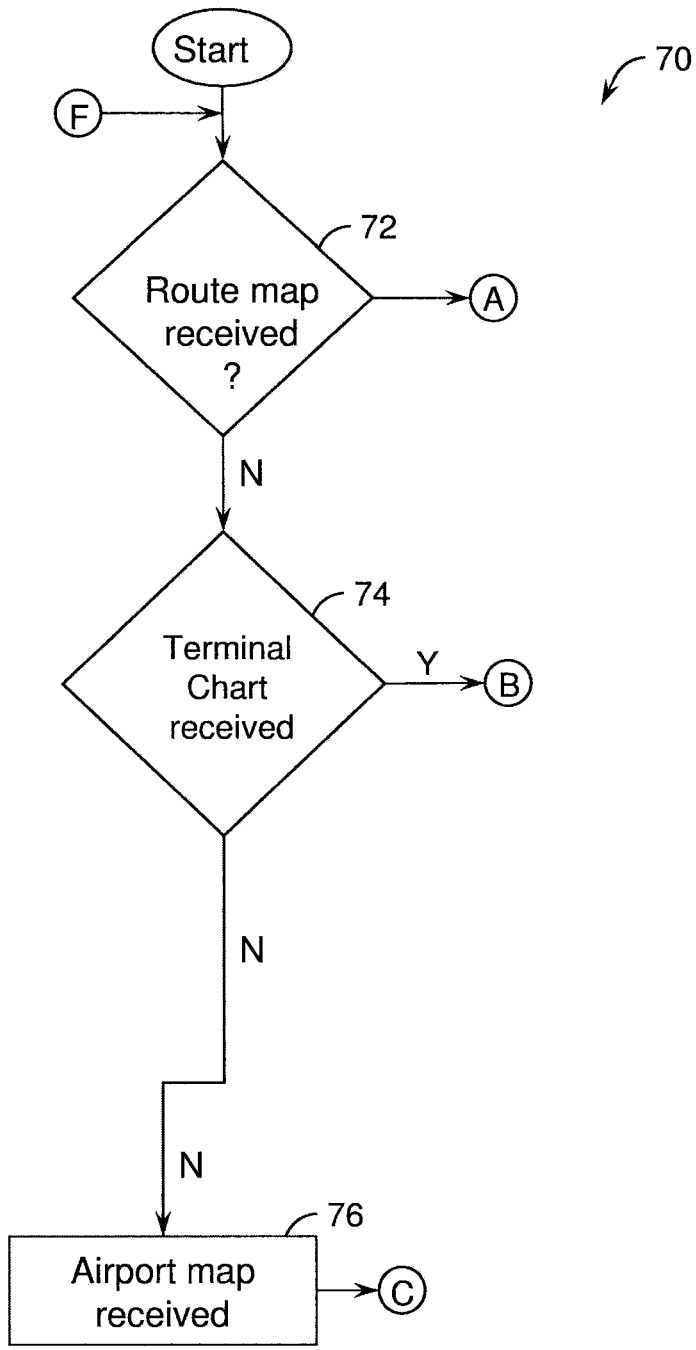
FIG. 3 is a flowchart illustrating a first operational sequence for the module of FIG. 2.

With reference to FIG. 3, a process flow diagram illustrates an exemplary operational sequence 70 performed by the image control module 43. The operational sequence 70 is associated with determining the data 44, 52 for display on the GUI 18. In operation 72, a determination is made if a route map request has been received. The route map request could be received as GUI data 48 from the GUI manager module 42 or could comprise input from a flight management system (not shown) associated with the aircraft 10. The route map request comprises user input indicative of a route of the aircraft 10, and includes origin and destination data. If the route has been received, then the operational sequence goes to A, in FIG. 4. Otherwise, in operation 74, a determination is made if a terminal chart request has been received. If a terminal chart request has been made, then the operational sequence goes to B in FIG. 8. Otherwise, the operational sequence determines that an airport map has been received at operation 76 and goes to C in FIG. 11.

Figure 4:
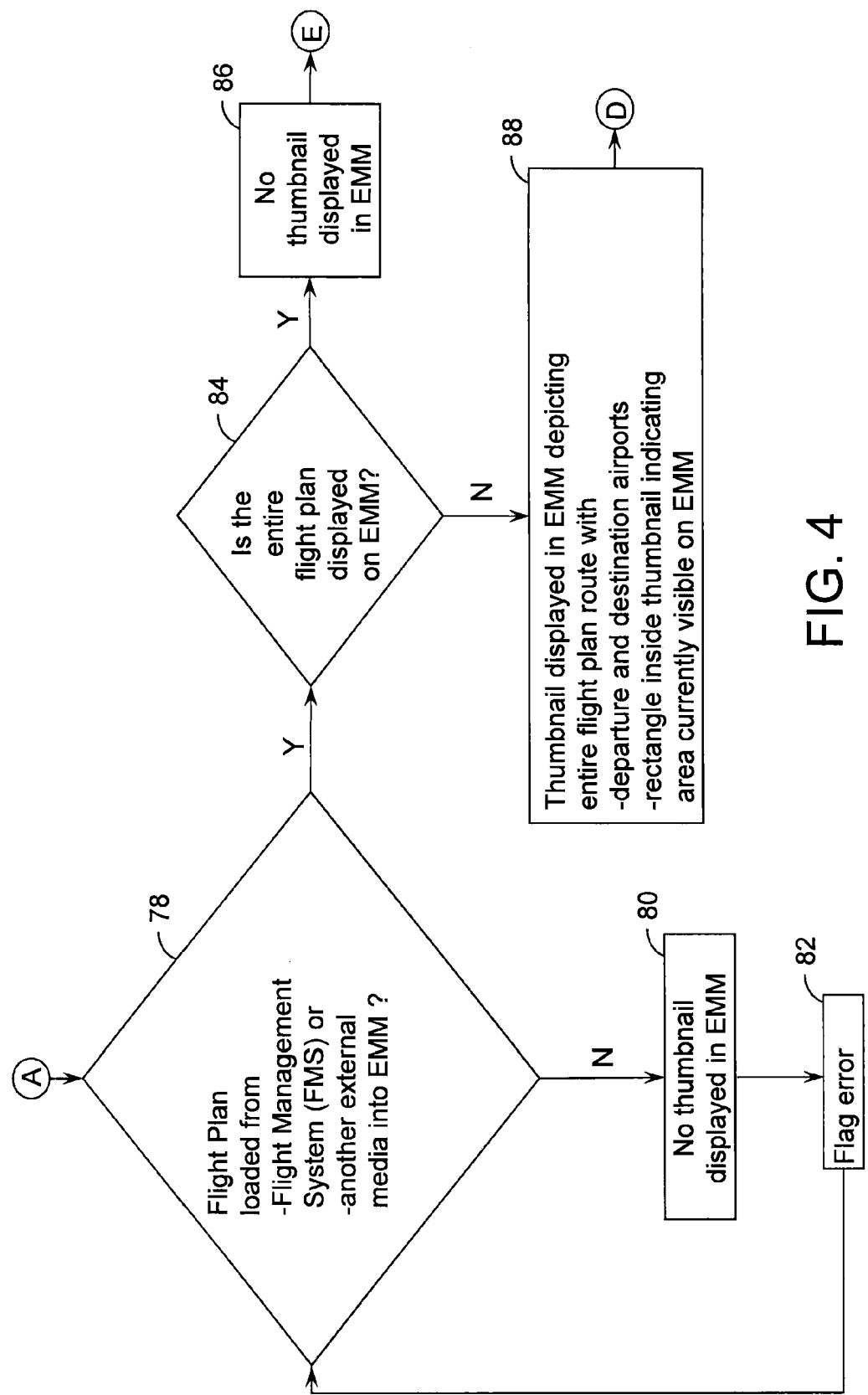
FIG. 4 is a flowchart illustrating a second operational sequence for the module of FIG. 2.

With reference to FIG. 4, a process flow diagram illustrates a second exemplary operational sequence 77 performed by the image control module 43 if a route map request has been received. Starting at A, in operation 78, a determination is made as to whether the flight plan or route is provided via the flight management system or other suitable input device, such as user input data 60. If the route is not provided, then the method goes to operation 80. At operation 80, the context display 26 is not displayed on the GUI 18. Then, at operation 82, an error is flagged and the method loops to operation 78.

Otherwise, if the route is provided, then in operation 84, a determination is made if the entire route is displayed in the primary display 24. If the entire route is displayed in the primary display 24, then the method, in operation 86, does not display the context display 26. Next, the method goes to E in FIG. 5. Otherwise, if the entire route is not displayed in the primary display 24, then, in operation 88, the context display 26 is displayed in the GUI 18. The context display 26 displayed includes the entire route with the departure or origin airport and the destination airport with the flight plan or route displayed connecting the origin airport with the destination airport. The desired route between the origin and destination airport is highlighted for clarity, as shown in FIG. 6. The context display 26 also includes the indicator 34, which illustrates the data displayed on the primary display 24 (FIG. 6). After displaying the context display 26 in operation 88, the method goes to D in FIG. 5.

Figure 5:
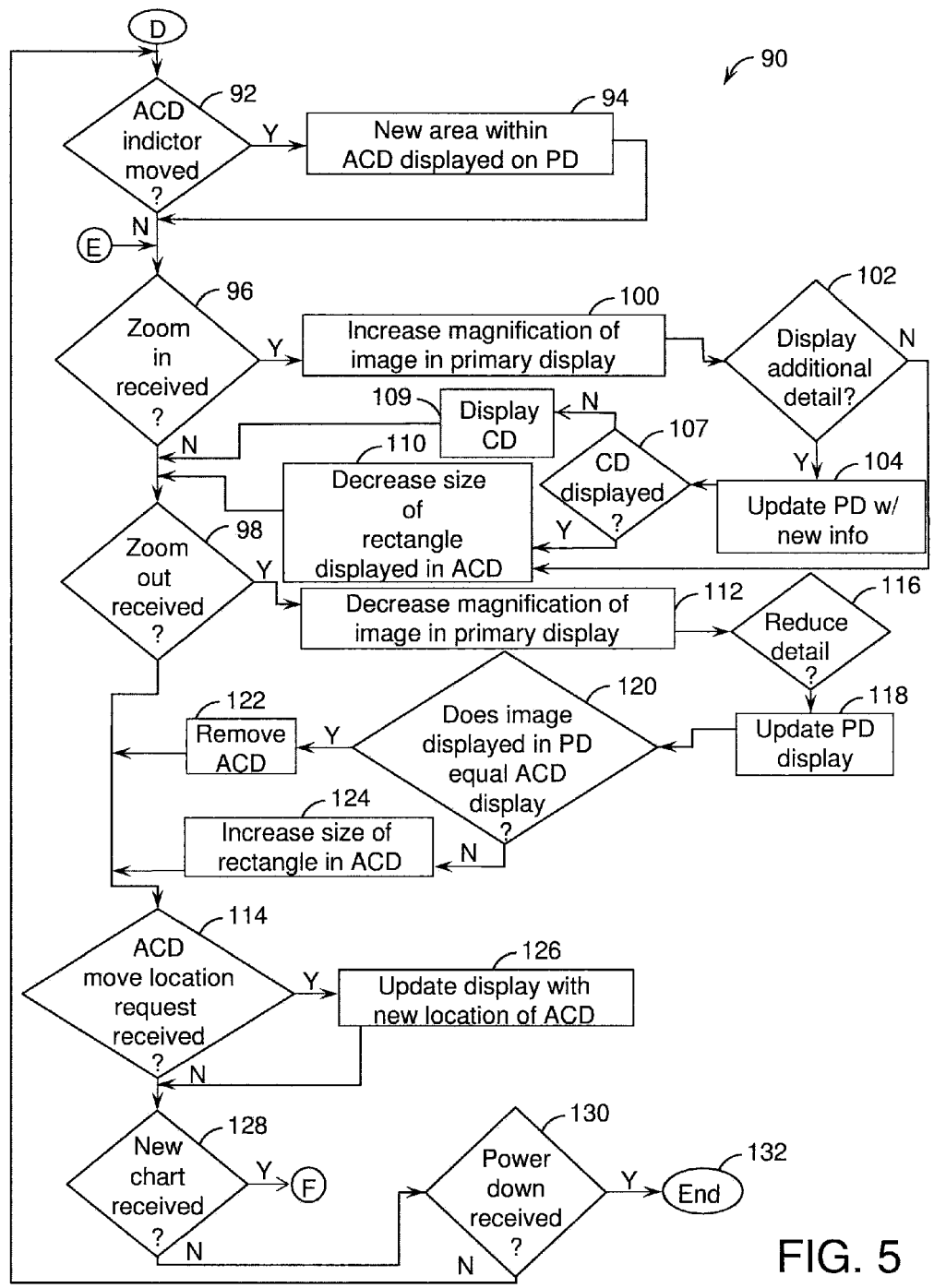
FIG. 5 is a flowchart illustrating a third operational sequence for the module of FIG. 2.
Figure 6:
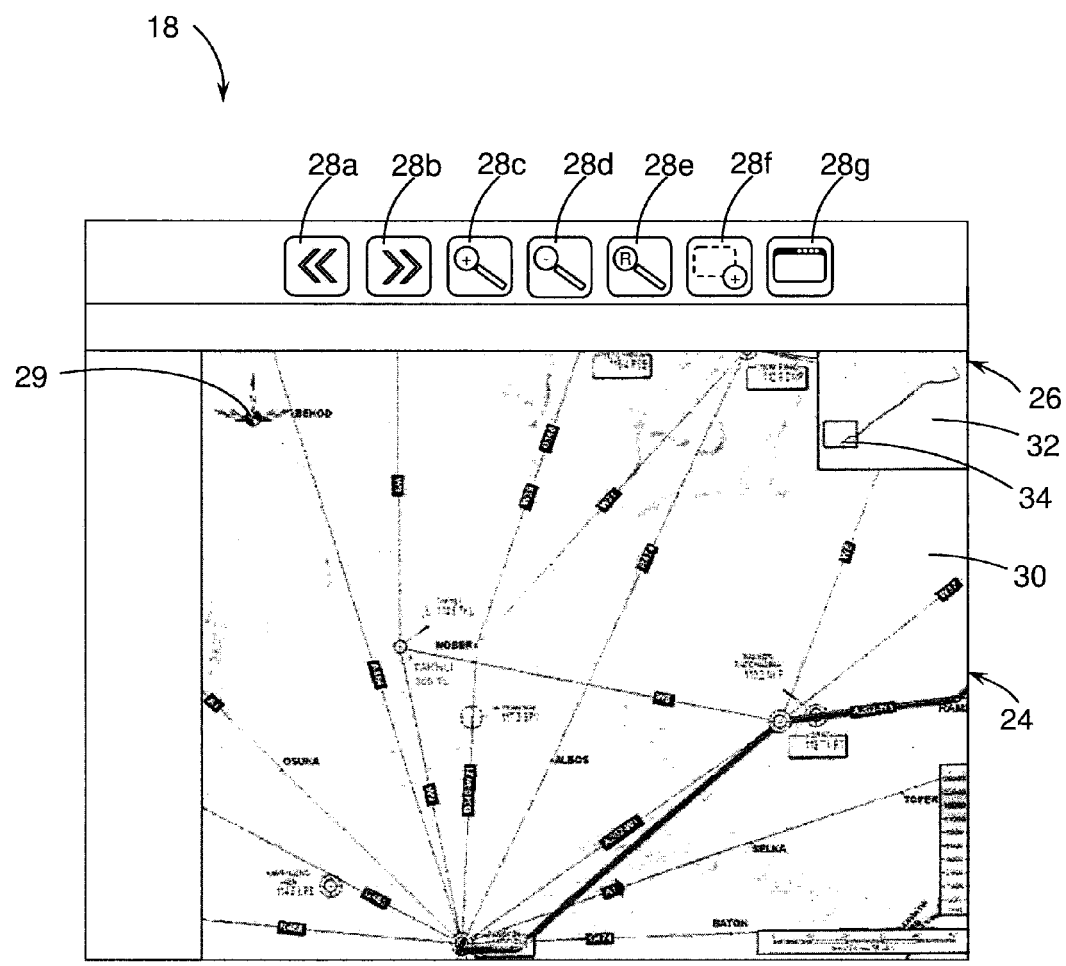
FIG. 6 is an exemplary view of the electronic moving map and aeronautical context display with the electronic moving map at a first magnification and the aeronautical context display at a first location according to the present disclosure.

In FIG. 5, a process flow diagram illustrates a third exemplary operational sequence 90 performed by the image control module 43. Starting at D, with the context display 26 displayed on the GUI 18, a determination is then made, at operation 92, if the indicator 34 of the context display 26 has been moved. If the indicator 34 has not been moved, then the operational sequence goes to operation 96. If the indicator 34 has been moved, through a received pan request, then, at operation 94, the new area selected through the repositioning of the indicator 34 is displayed on the primary display 24. Next, the operational sequence goes to operation 96. In addition, if no context display 26 is displayed in operation 84, then the operational sequence also goes to operation 96.

In operation 96, a determination is made as to whether a zoom in request has been made. If a zoom in request has not been made, then the operational sequence goes to operation 98. Otherwise, if the zoom in request has been made, then the operational sequence goes to operation 100. In operation 100, the operational sequence increases the magnification of the primary display data 30 displayed in the primary display 24. Then, in operation 102, a determination is made whether to display additional detail on the primary display 24. The primary display module 36 determines to include a higher level of detail with the primary display data 30 when the magnification level of the primary display 24 is such that the additional detail is read on the primary display 24. If the primary display module 36 decides to include the additional detail, then in operation 104, the primary display 24 is updated with the additional data. The additional detail includes airports, route identifiers, morse code, geographical terrain, altitude and/or other suitable data associated with the map on the primary display 24. For example, with reference to FIGS. 6 and 7, the magnification of the primary display 24 in FIG. 6 has been increased in FIG. 7. Due to the increase in magnification, additional detail, such as airports 106 and route identifiers 108 are included on the primary display 24 in FIG. 7. With reference back to FIG. 5, in operation 107, a determination is made as to whether the context display 26 is displayed on the GUI 18. If the context display 26 is displayed, then the operational sequence goes to operation 110. Otherwise, in operation 109, the context display 26 is displayed on the GUI 18, and includes the entire route and the indicator 34, as discussed herein.

Figure 7:
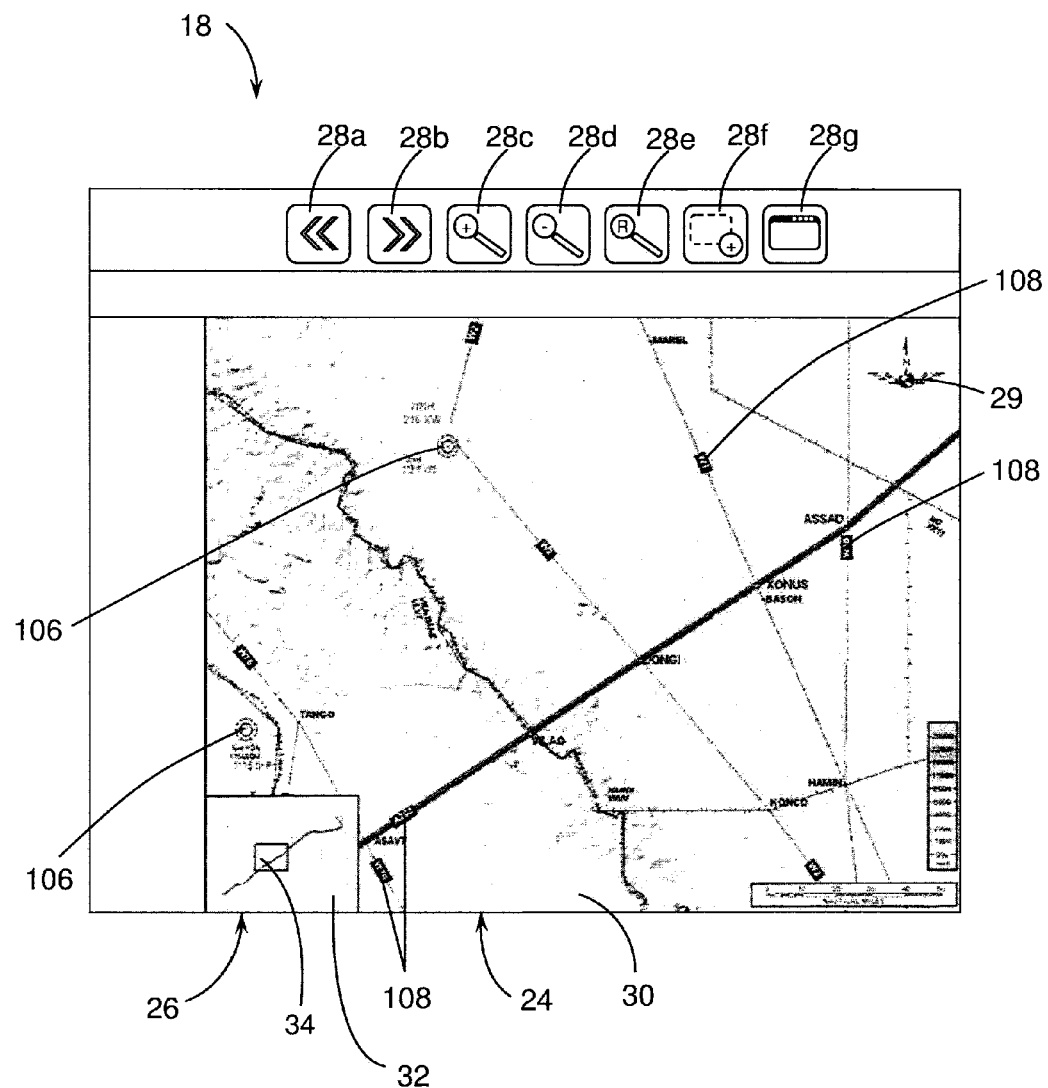
FIG. 7 is an exemplary view of the electronic moving map and aeronautical context display with the electronic moving map at a second magnification and the aeronautical context display at a second location according to the present disclosure.

In operation 110, the operational sequence decreases the size of the indicator 34 displayed on the context display 26 to represent the new geographic area displayed on the primary display 24. As shown in FIG. 7, the size of the indicator 34 is decreased with regard to the indicator 34 associated with the GUI 18 of FIG. 6, to represent the new geographic area displayed on the primary display 24.

Next at operation 98, the operational sequence determines if a zoom out request has been received. If a zoom out request has been received, then the operational sequence goes to operation 112. Otherwise the operational sequence goes to operation 114. In operation 112, upon receipt of the zoom out request, the image control module 43 decreases the magnification of the primary display data 30. Next, in operation 116, a determination is made whether to reduce the detail included with the primary display data 30. If the detail is reduced, then in operation 118 the primary display data 30 is updated with the reduced detail. The detail is removed when, due to the magnification of the primary display data 30, the detail is unreadable. Otherwise, in operation 120, a determination is made as to whether the primary display data 30 in the primary display 24 is equal to the entire route, including the origin and destination of the route of the aircraft 10. If the primary display data 30 is equal to the entire route of the aircraft 10, then in operation 122, the context display 26 is removed from the GUI 18. If the primary display data 30 is not equal to the entire route of the aircraft 10, then in operation 124, the indicator 34 will appear together with the context display data 32 to represent the larger amount of geographic data displayed on the primary display 24. If the zoom-in request is received for displaying a portion of the primary display 24 in greater detail, then the indicator 34 in the context display 26 will decrease its size to reflect the smaller portion of the entire flight route visible on the primary display 24. If the zoom-out request is received for displaying a greater range of the route on the primary display 24, then the indicator 34 in the context display 26 will increase its size to indicate that more of the entire flight route is visible on the primary display 24. Should a zooming-out process result in the display of the entire flight route on the primary display 24, then the context display 32 is removed along with its content.

Next, in operation 114, a determination is made as to whether a request to change a location of the context display 26 in the GUI 18 has been made. The location of the context display 26 is changed as desired through the user input device 22, such as through selecting the context display 26 and dragging the context display 26 to a desired location, as shown in FIG. 7. Alternatively, a separate GUI could be used to select the location of the context display 26 on the GUI 18. If the image control module 43 determines that a request to change the location of the context display 26 has been made, then in operation 126, the image control module 43 updates the GUI 18 with the new location of the context display 26.

Next, in operation 128, a determination is made as to whether a new chart request has been received. A new chart request could comprise user input data 60 received by the GUI manager module 42. The user input data 60 could comprise a request to access a different geographic area, such as a terminal chart or airport map associated with the origin and/or the destination of the route of the aircraft 10. Upon the receipt of a new chart request, the operational sequence goes to F in FIG. 3. Otherwise, a determination is made as to whether a power-down request is made in operation 130. If a power-down request has been made, then the operational sequence ends in operation 132. Otherwise, the operational sequence loops to operation 92.

Figure 8:
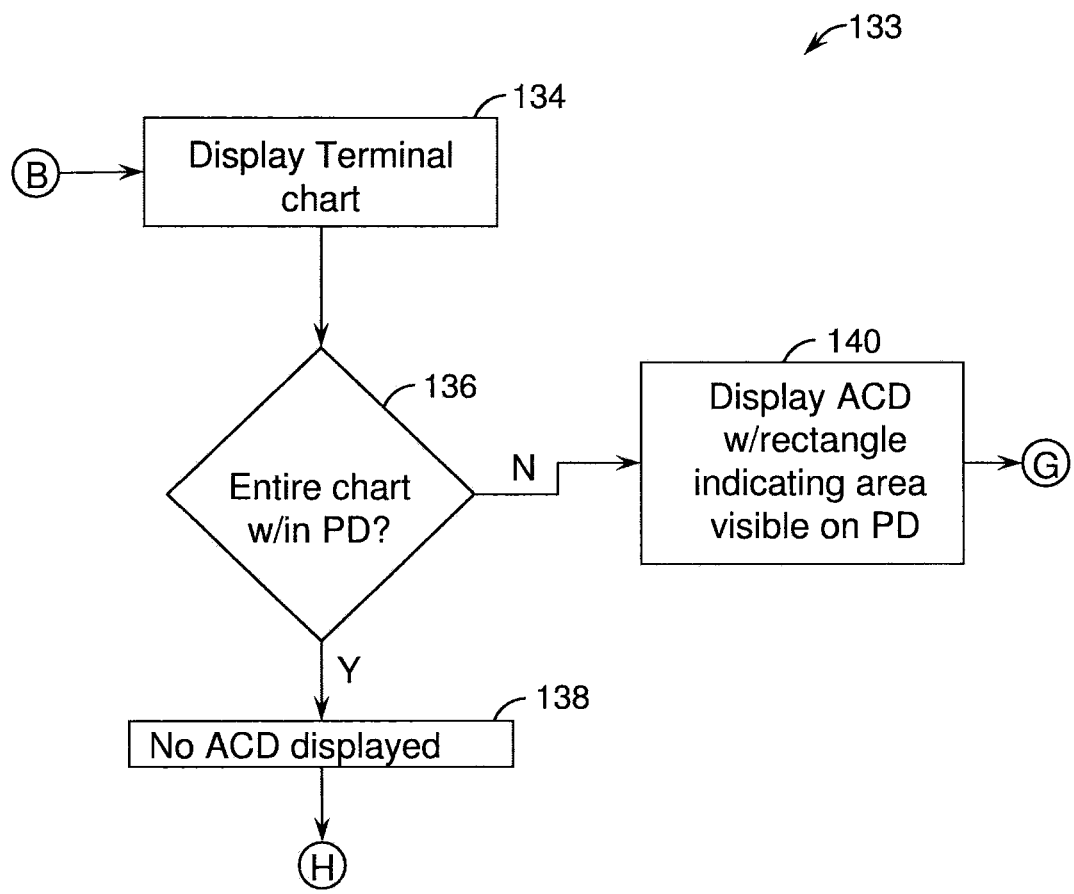
FIG. 8 is a flowchart illustrating a fourth operational sequence for the module of FIG. 2.

With reference back to FIG. 3, if a terminal chart has been received in operation 74, then the operational sequence goes to B in FIG. 8. With reference to FIG. 8, a process flow diagram illustrates a fourth exemplary operational sequence 133 performed by the image control module 43. Starting at B, the operational sequence goes to operation 134. In operation 134, the image control module 43 displays the terminal chart within the primary display 24. In operation 136, a determination is made as to whether the entire terminal chart fits within the primary display 24. If the entire terminal chart fits within the primary display 24, then the operational sequence goes to operation 138. In operation 138, no context display 26 is displayed on the GUI 18. Then, the operational sequence goes to H in FIG. 9. Otherwise, if the entire terminal chart does not fit within the primary display 24, then the context display 26 is displayed in operation 140, with the indicator 34 indicating the portion of the terminal chart displayed on the primary display 24, as shown in FIG. 10. With reference to FIG. 10, FIG. 10 illustrates an exemplary terminal chart 142 displayed in the GUI 18. As the terminal chart 142 is too large to fit within the primary display 24, the context display 26 includes the entire terminal chart 142 with the indicator 34 representing the geographic area of the terminal chart 142 that is displayed in the primary display 24.

Figure 9:
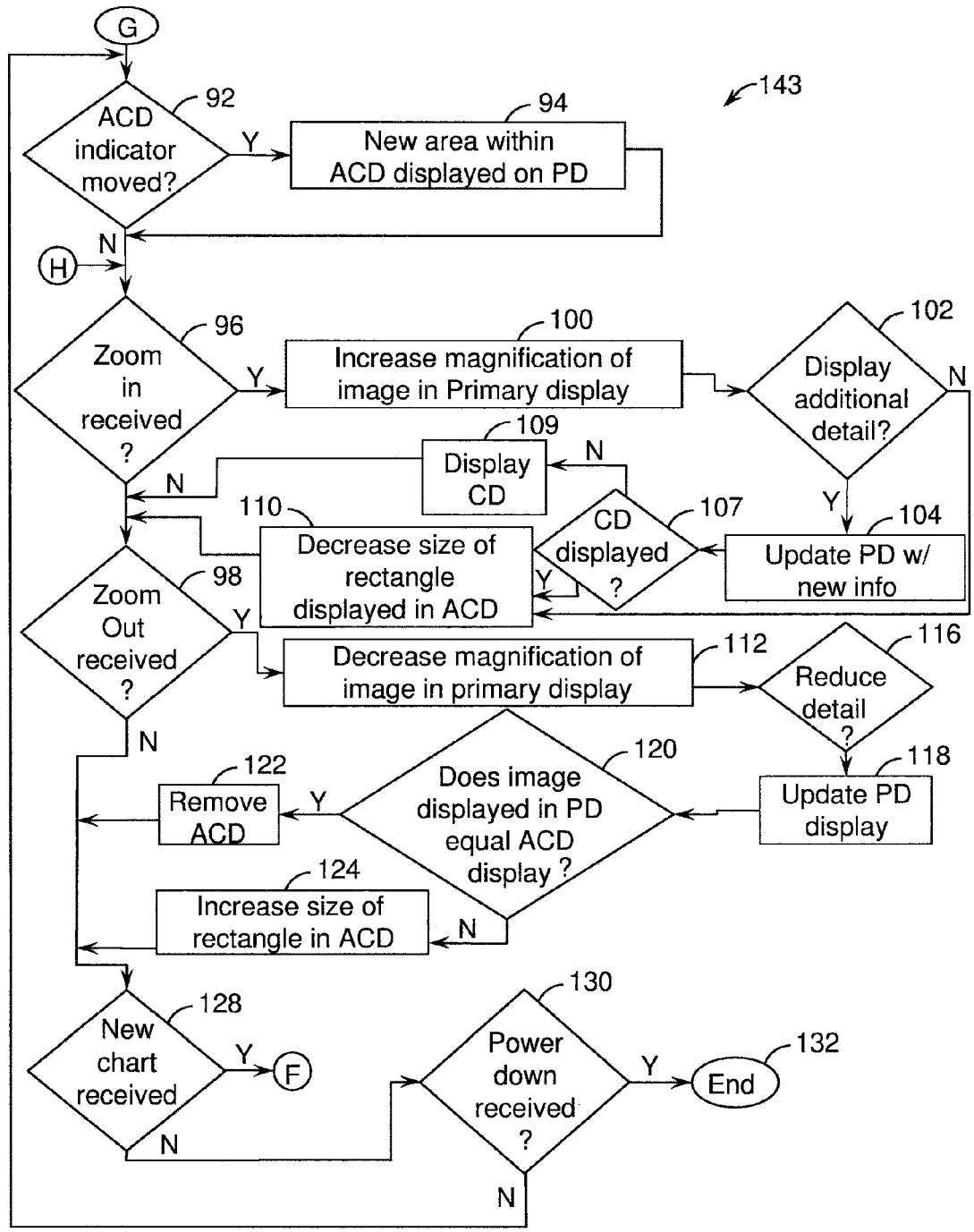
FIG. 9 is a flowchart illustrating a fifth operational sequence for the module of FIG. 2.
Figure 10:
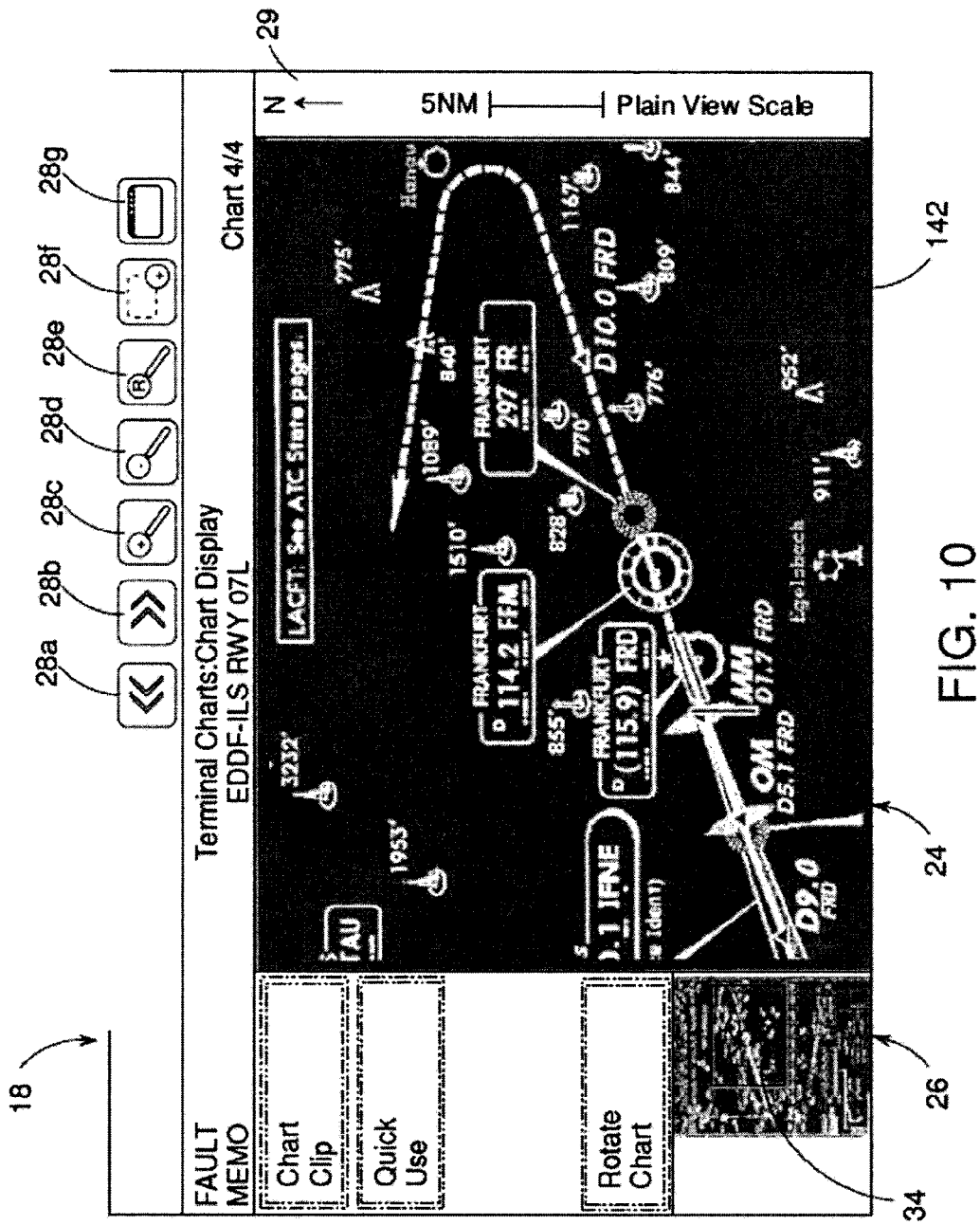
FIG. 10 is an exemplary view of an alternative electronic moving map and aeronautical context display according to the present disclosure.

With reference back to FIG. 8, after the context display 26 is displayed, the operational sequence goes to G in FIG. 9. With reference to FIG. 9, FIG. 9 is a process flow diagram that illustrates a fifth exemplary operational sequence 143 performed by the image control module 43. As the operational sequence 143 performed by the image control module 43 in FIG. 9 has similar operations as the operational sequence 90 performed by the image control module 43 in FIG. 5, the same reference numbers will be used to denote the same operations performed with respect to the display of the terminal chart 142 in the GUI 18.

In FIG. 9, starting at G, at operation 92, a determination is made as to whether a request to move the indicator 34 in the context display 26 in the GUI 18 has been received. If a request to move the indicator 34 has not been received through the GUI 18, then the operational sequence goes to operation 96. If the indicator 34 has been moved, through a received pan request, then, at operation 94, the new area selected through the repositioning of the indicator 34 is displayed on the primary display 24. Next, the operational sequence to operation 96. In addition, if no context display 26 is displayed in operation 138, then the operational sequence also goes to operation 96.

In operation 96, a determination is made as to whether a zoom in request has been made. If a zoom in request has not been made, then the operational sequence goes to operation 98. Otherwise, if the zoom in request has been made, then the operational sequence goes to operation 100. In operation 100, the operational sequence increases the magnification of the primary display data 30 displayed in the primary display 24. Then, in operation 102, a determination is made whether to display additional detail on the primary display 24. If the primary display module 36 decides to include the additional detail, then in operation 104, the primary display 24 is updated with the additional data. The additional detail includes approach minimas, elevations, performance and route related information with regard to a terminal chart, and includes runway identification, taxiway identification and gate information in an airport map application, as will be discussed herein. Then, in operation 107, a determination is made as to whether the context display 26 is displayed on the GUI 18. If the context display 26 is displayed, then the operational sequence goes to operation 110. Otherwise, in operation 109, the context display 26 is displayed on the GUI 18, and includes the entire route and the indicator 34, as discussed herein.

In operation 110, the operational sequence decreases the size of the indicator 34 displayed on the context display 26 to represent the new geographic area displayed on the primary display 24. Next at operation 98, the operational sequence determines if a zoom out request has been received. If a zoom out request has been received, then the operational sequence goes to operation 112. Otherwise the operational sequence goes to operation 128. In operation 112, upon receipt of the zoom out request, the image control module 43 decreases the magnification of the primary display data 30. Next, in operation 116, a determination is made whether to reduce the detail included with the primary display data 30. If the detail is reduced, then in operation 118 the primary display data 30 is updated with the reduced detail.

Otherwise, in operation 120, a determination is made as to whether the primary display data 30 in the primary display 24 is equal to the entire terminal chart or airport map in an airport map application, as will be discussed herein. If the primary display data 30 is equal to the entire terminal chart or airport map, then in operation 122, the context display 26 is removed from the GUI 18. If the primary display data 30 is not equal to the entire terminal chart or airport map, then in operation 124, the size of the indicator 34 in the context display data 32 is increased to represent the larger amount of geographic data displayed on the primary display 24. If the zoom-in request is received for displaying a portion on the primary display 24 in greater detail, then the indicator 34 in the context display 26 will decrease its size to reflect the smaller portion of the entire terminal/airport map visible on the primary display 24. If the zoom-out request is received from the primary display 24, then the indicator 34 in the context display 26 will increase its size to indicate that more of the entire terminal/airport map is visible on the primary display 24. Should a zooming-out process result in the display of the entire terminal/airport map on the primary display 24, then the context display 32 is removed along with its content.

In operation 128, a determination is made as to whether a new chart request has been received. The user input data 60 could comprise a request to access a different geographic area, such as a route or airport map, or terminal chart instead of an airport map in an airport map application, each associated with the origin and/or the destination of the route of the aircraft 10. Upon the receipt of a new chart request, the operational sequence goes to F in FIG. 3. Otherwise, a determination is made as to whether a power-down request is made in operation 130. If a power-down request has been made, then the operational sequence ends in operation 132. Otherwise, the operational sequence loops to operation 92.

Figure 11:
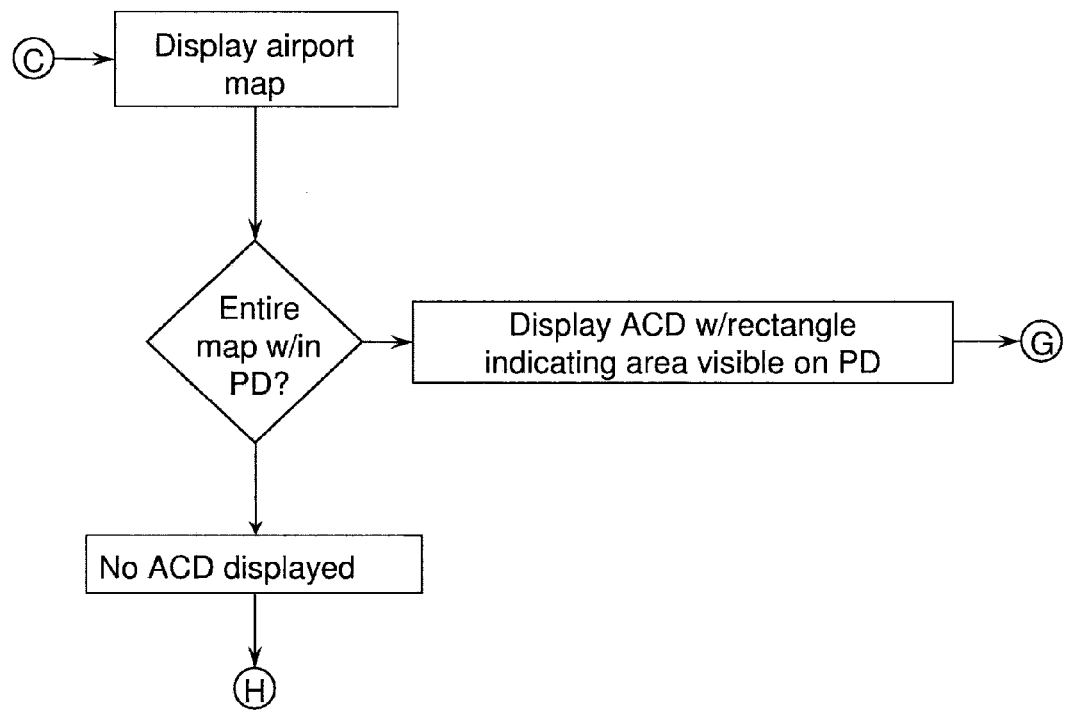
FIG. 11 is a flowchart illustrating a sixth operational sequence for the module of FIG. 2.
Figure 12:
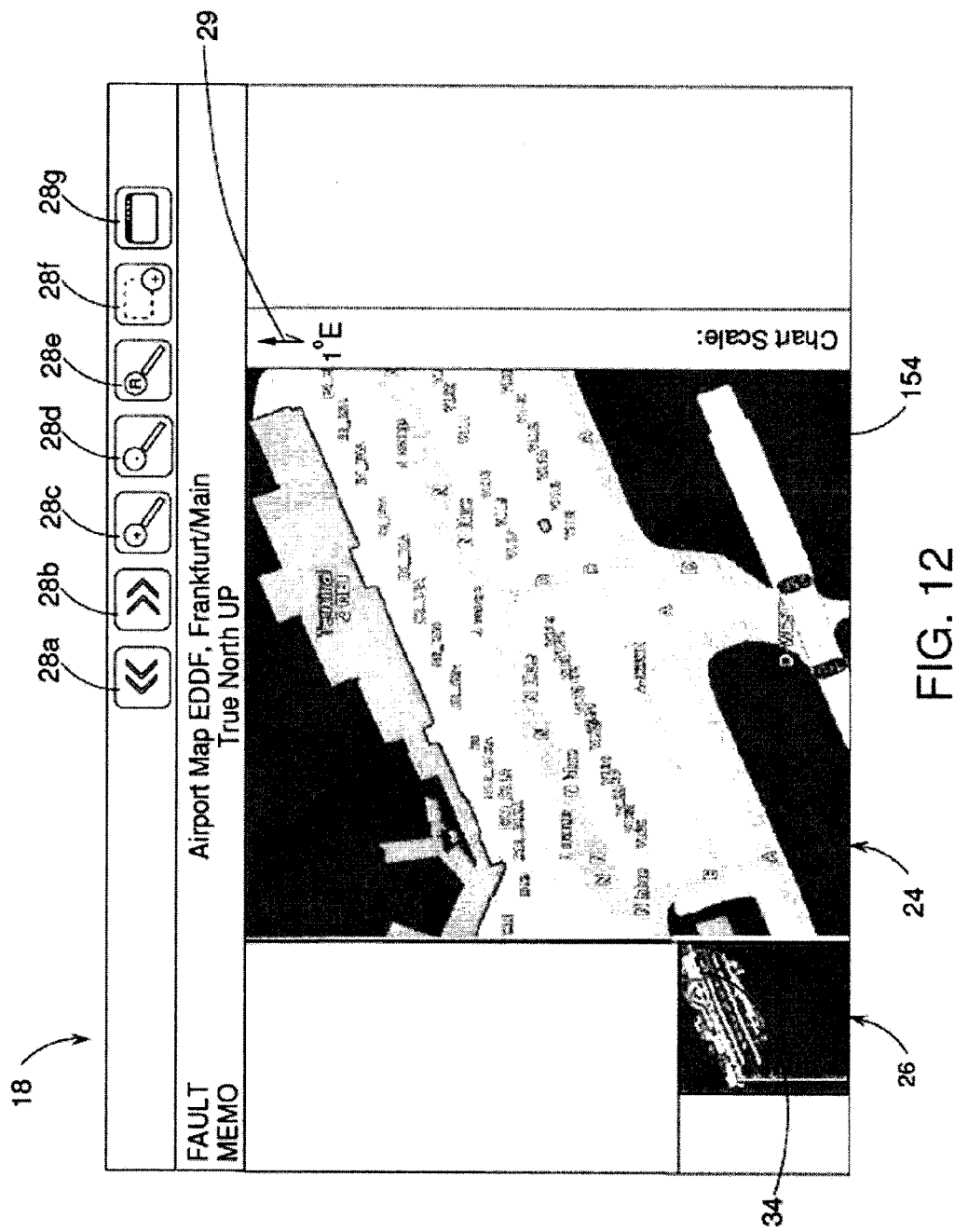
FIG. 12 is an exemplary view of a second alternative electronic moving map and aeronautical context display according to the present disclosure.

With reference back to FIG. 3, if it is determined that an airport map request has been received then the operational sequence goes to C in FIG. 11. With reference now to FIG. 11, FIG. 11 is a process flow diagram that illustrates a sixth exemplary operational sequence 144 performed by the image control module 43. Starting at C, in operation 146, the selected airport map is displayed on the primary display 24 of the GUI 18. Then, in operation 148, a determination is made as to whether the entire airport map is displayed within the primary display 24. If the entire airport map is displayed within the primary display 24, then at operation 150, no context display 26 is displayed in the GUI 18 and the operational sequence goes to H in FIG. 9. Otherwise, if the entire airport map does not fit within the primary display 24 of the GUI 18, then in operation 152 the entire airport map is displayed on the context display 26 with the indicator 34 representing the portion of the airport map displayed in the primary display 24, as shown in FIG. 12. In FIG. 12, a portion of an exemplary airport map 154 is shown in the primary display 24, and the context display 26 includes the entire airport map 154 with the indicator 34 illustrating the portion of the airport map 154 displayed in the primary display 24. With reference back to FIG. 11, after the context display 26 is determined to be displayed on the GUI 18, the operational sequence goes to G on FIG. 9.

With reference back to FIG. 9, as the operational sequence associated with the terminal chart is the same as the operational sequence performed by the image control module 43 when an airport map is requested, the operational sequence associated with the receipt of a pan request, a zoom in request, a zoom out request and a new chart request will not be discussed in detail with regard to the airport map application. Rather, it will be understood that the same operational sequence used with a terminal chart application is applicable to an airport map application, and thus, the operational sequence of FIG. 9 will not be discussed further herein with regard to an airport map application.

Thus, in operation, when a user, through the user input device 22, selects a particular map for display on the GUI 18, the image control module 43, determines, based on the size of the map, whether to display the context display 26. The map selected could be a geographic area associated with the route of the aircraft 10, a terminal chart associated with an airport, such as the origin or destination airport of the aircraft 10, or an airport map associated with an airport, such as the origin or destination airport of the aircraft 10. If the context display 26 is displayed, the context display 26 provides an image of the entire map with the indicator 34 representing the portion of the map displayed on the primary display 24. With the context display 26 displayed, the user, through the user input device 22, requests to pan the image in the primary display 24 by moving the indicator 34 in the context display 26. With or without the context display 26, the user, through the user input device 22, may pan, zoom in, or zoom out using the buttons 28. Based on a request to pan the image, the image control module 43 updates the primary display 24 to display the selected portion, and updates the location of the indicator 34 on the context display 26 to correlate with the image resulting from the panning of the image in the primary display 24.

If a zoom-in request is received, then the image control module 43 displays additional detail on the primary display 24, if appropriate, and reduces the size of the indicator 34 in the context display 26, if the context display 26 is displayed. If the context display 26 is not displayed, then the image control module 43 displays the context display 26. If a zoom-out request is received, then the image control module 43 reduces the magnification of the image in the primary display 24 and reduces the detail displayed on the image in the primary display 24, if appropriate. Then the image control module 43 increases the size of the context display 26, if the image displayed in the primary display 24 is not the entire map. If the entire map, terminal chart or airport map is displayed, then the image control module 43 removes the context display 26 from the GUI 18.

If a route map is selected, then a request may be made by the user, through the user input device 22, to move the location of the context display 26. If this request is received, then the image control module 43 moves the location of the context display 26 as requested.

If a new chart request is received, then the image control module 43 displays the selected map, terminal chart or airport map and perform the operational sequence associated with that type of map. If a power-down request is received, the image control module 43 ends the operational sequence.

Thus, the image control module 43 of the present disclosure enables a user to view a portion of the route map, terminal chart or airport map, while providing the user with the context of the image he/she is viewing via the context display 26. Further, the image control module 43 enables the user to easily zoom and pan the image as necessary for navigating the mobile platform on aircraft. Furthermore, the image control module 43 eliminates the need for paper-based aeronautical maps.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out this disclosure, but that the scope of the present disclosure will include any embodiments falling within the foregoing description and the appended claims.

What is claimed is:

1. A system for controlling a display of geographic data to assist in the navigation of a mobile platform comprising:
    a graphical user interface module that generates a primary display and a context display on a display screen;
    a user input that enables a user to select geographic data to be used by the primary display and the context display;
    an image control module responsive to the geographic data that uses the geographic data to generate information used to populate the primary display and the context display, with the context display being presented as an overlay over a minor portion of the primary display and illustrating a complete route of the mobile platform, and with the information shown on the primary display being presented at a first magnification level and the information shown on the context display presented at a second magnification level that is lower than the first magnification level; and
    the image control module further generating an indicator displayed on the context display, and which is moveable within the context display, that indicates that specific portion of the geographic data being shown in the context display that is to be displayed in the primary display, and the indicator of the context display able to be panned through a command input by the user to any subarea of the context display, which causes a corresponding panning of the geographic information presented on the primary display at the first magnification level.

2. The system of claim 1, wherein the geographic data comprises an airport map.

3. The system of claim 1, wherein the geographic data comprises a terminal chart associated with an airport.

4. The system of claim 1, wherein the geographic data includes a planned route of travel of the mobile platform from a departure location to a destination location.

5. The system of claim 1, wherein the image control module comprises an input for receiving a zoom request from the user which enables a user to change a magnification level being used to display the geographic data on the primary display.

6. The system of claim 1, wherein the user input is applied via a joystick control element.

7. The system of claim 1, wherein the image control module is responsive to a zoom button input and a joystick control element, and where the zoom button input and the joystick control element cooperatively enable the user to draw, on the primary display, an indication of a specific portion of the geographic data being display on the primary display that is to be magnified.

8. The system of claim 1, wherein dimensions of the indicator are enlarged and reduced in accordance with a zoom command provided by the user to the image control module.

9. The system of claim 1, wherein the image control module automatically generates the context display when all of the geographic data cannot be displayed on the primary display at a selected level of magnification.

10. The system of claim 4, wherein the image control module automatically generates the context display when the planned route of travel is not able to be shown completely on the primary display, and wherein the indicator circumscribes that portion of the planned route of travel that is being displayed on the primary display.

11. The system of claim 1, wherein the image control module automatically removes the indicator if an entirety of the geographic data can be displayed on the primary display.

12. A system for controlling a display of geographic data to assist in the navigation of a mobile platform comprising:
    a graphical user interface module that generates a primary display and a context display on a display screen;
    a user input that enables a user to select geographic data to be used by the primary display and the context display;
    an image control module responsive to the geographic data that uses the geographic data to generate information used to populate the primary display and the context display, with the context display being presented as an overlay over a portion of the primary display and displaying a complete route of the mobile platform;
    the image control module further generating an indicator displayed on the context display that is moveable within the context display, and which indicates a specific portion of the geographic data being shown in the context display which is to also be presented in the primary display, and with the information shown on the primary display being presented at a first magnification level and the information shown on the context display presented at a second magnification level that is lower than the first magnification level, and the indicator able to be panned by:
    inputting a first pan command to pan a scene of the geographic data displayed on the primary display, which causes a corresponding panning movement of the indicator; or
    inputting a second pan command to directly pan the indicator, which causes a corresponding panning movement of the scene of the geographic data in the primary display.

13. The system of claim 12, wherein dimensions of the indicator are controlled in accordance with a magnification selected for displaying the scene in the primary display.

14. The system of claim 12, wherein the context display and the indicator are both automatically generated and displayed by the image control module when an entirety of the scene of the geographic data is not able to be displayed on the primary display.

15. The system of claim 14, wherein the indicator is automatically removed by the image control module when the entirety of the scene of the geographic data is able to be displayed on the primary display.

16. The system of claim 12, wherein the indicator comprises a rectangular line forming a box that is overlayed on the context display.

17. The system of claim 12, wherein the image control module determines if additional detail is able to displayed on the primary display when a magnification of the scene of the geographic data is increased, and displays the additional detail on the primary display.

18. The system of claim 12, wherein the geographic data comprises a terminal chart associated with an airport.

19. The system of claim 12, wherein the geographic data comprises a line overlayed on the geographic data on the primary display representing a route of the mobile platform.

20. The system of claim 19, wherein a corresponding line is overlayed on the context display.

* * * * *